(12) United States Patent
Tsai et al.

(10) Patent No.: US 10,992,950 B2
(45) Date of Patent: Apr. 27, 2021

(54) CODING BLOCK BITSTREAM STRUCTURE AND SYNTAX IN VIDEO CODING SYSTEMS AND METHODS

(71) Applicant: REALNETWORKS, INC., Seattle, WA (US)

(72) Inventors: Chia-Yang Tsai, Bellevue, WA (US); Chao Kuang, Seattle, WA (US); Xiaobo Liu, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 0 days.

(21) Appl. No.: 16/488,219

(22) PCT Filed: Feb. 23, 2017

(86) PCT No.: PCT/CN2017/074592
§ 371 (c)(1),
(2) Date: Aug. 22, 2019

(87) PCT Pub. No.: WO2018/152749
PCT Pub. Date: Aug. 30, 2018

(65) Prior Publication Data
US 2019/0394485 A1 Dec. 26, 2019

(51) Int. Cl.
*H04N 19/119* (2014.01)
*H04N 19/176* (2014.01)
(Continued)

(52) U.S. Cl.
CPC ........... *H04N 19/52* (2014.11); *H04N 19/105* (2014.11); *H04N 19/119* (2014.11);
(Continued)

(58) Field of Classification Search
CPC .......................... H04N 19/52; H04N 19/105
See application file for complete search history.

(56) References Cited

U.S. PATENT DOCUMENTS 10,123,006 B2 * 11/2018 Schierl ................ H04N 19/70
10,218,974 B2 * 2/2019 Tsai ...................... H04N 19/61
(Continued)

FOREIGN PATENT DOCUMENTS

| CN | 102611881 A | 7/2012 |
| CN | 104756498 A | 7/2015 |
| CN | 106131568 A | 11/2016 |

OTHER PUBLICATIONS

Alvarez-Mesa et al., "Parallel Video Decoding in the Emerging HEVC Standard," Embedded Systems Architectures, ICASSP 2012, 4 pages.

*Primary Examiner* — Irfan Habib
(74) *Attorney, Agent, or Firm* — Seed IP Law Group LLP

(57) ABSTRACT

Provided herein are systems and methods for encoding an array of coefficients representing an unencoded video frame of a sequence of video frames to generate an encoded bit-stream representative of the unencoded video frame. The array of coefficients may have a plurality of coefficient rows and a plurality of coefficient columns and the encoded bit-stream representative of the unencoded video frame may include at least a header and a video data payload. Accordingly, the array of coefficients may be separated into an array of coding blocks; each array of coding blocks may be placed into a coding stripe and each coding stripe may be placed into a coding stripe group. The array of coefficients may then be encoded such that the coefficients of a coding block are encoded using information obtained only from other coefficients in the same coding stripe group and a first video data payload portion of the video data payload corresponding to the coding stripe is an integer number of bytes in length.

12 Claims, 16 Drawing Sheets

(51) Int. Cl.
*H04N 19/196* (2014.01)
*H04N 19/52* (2014.01)
*H04N 19/105* (2014.01)
*H04N 19/46* (2014.01)

(52) U.S. Cl.
CPC ......... *H04N 19/176* (2014.11); *H04N 19/196* (2014.11); *H04N 19/46* (2014.11)

(56) References Cited

U.S. PATENT DOCUMENTS

| | | | |
|---|---|---|---|
| 10,321,150 B2* | 6/2019 | Tsai | H04N 19/46 |
| 10,531,086 B2* | 1/2020 | Tsai | H04N 19/176 |
| 10,652,569 B2* | 5/2020 | Tsai | H04N 19/52 |
| 10,659,779 B2* | 5/2020 | Tsai | H04N 19/117 |
| 2012/0082218 A1* | 4/2012 | Mirsa | H04N 7/32 |
| 2012/0263231 A1* | 10/2012 | Zhou | H04N 19/105 375/240.12 |
| 2012/0320984 A1* | 12/2012 | Zhou | H04N 19/463 375/240.16 |
| 2014/0003532 A1* | 1/2014 | Coban | H04N 19/463 375/240.24 |
| 2014/0376638 A1* | 12/2014 | Nakamura | H04N 19/174 375/240.16 |
| 2015/0023409 A1* | 1/2015 | Schierl | H04N 19/13 375/240.02 |

* cited by examiner

| | | | | | | | | | | |
|---|---|---|---|---|---|---|---|---|---|---|
| 608A | 610A | 610B | 610C | 610D | 610E | 610F | 610G | 610H | 610I | 610J | 605A |
| | 613A | 613B | 613C | 613D | 613E | 613F | 613G | 613H | 613I | 613J | 605B |
| 608B | 615A | 615B | 615C | 615D | 615E | 615F | 615G | 615H | 615I | 615J | 605C |
| | 618A | 618B | 618C | 618D | 618E | 618F | 618G | 618H | 618I | 618J | 605D |
| | 620A | 620B | 620C | 620D | 620E | 620F | 620G | 620H | 620I | 620J | 605E |
| | 623A | 623B | 623C | 623D | 623E | 623F | 623G | 623H | 623I | 623J | 605F |
| | 625A | 625B | 625C | 625D | 625E | 625F | 625G | 625H | 625I | 625J | 605G |
| | 628A | 628B | 628C | 628D | 628E | 628F | 628G | 628H | 628I | 628J | 605H |

| | | | | | | | | | | |
|---|---|---|---|---|---|---|---|---|---|---|
| 508A | 610A | 610B | 610C | 610D | 610E | 610F | 610G | 610H | 610I | 610J | 505A |
| | 613A | 613B | 613C | 613D | 613E | 613F | 613G | 613H | 613I | 613J | 505B |
| 508B | 615A | 615B | 615C | 615D | 615E | 615F | 615G | 615H | 615I | 615J | 505C |
| | 618A | 618B | 618C | 618D | 618E | 618F | 618G | 618H | 618I | 618J | 505D |
| | 620A | 620B | 620C | 620D | 620E | 620F | 620G | 620H | 620I | 620J | 505E |
| | 623A | 623B | 623C | 623D | 623E | 623F | 623G | 623H | 623I | 623J | 505F |
| | 625A | 625B | 625C | 625D | 625E | 625F | 625G | 625H | 625I | 625J | 505G |
| | 628A | 628B | 628C | 628D | 628E | 628F | 628G | 628H | 628I | 628J | 505H |

| 1110 A | 1110 B | 1110 C | 1110 D | 1110 E | 1110 F | 1110 G | 1110 H | 1110I | 1110 J |
|---|---|---|---|---|---|---|---|---|---|
| 1113 A | 1113 B | 1113 C | 1113 D | 1113 E | 1113 F | 1113 G | 1113 H | 1113I | 1113 J |
| 1115 A | 1115 B | 1115 C | 1115 D | 1115 E | 1115 F | 1115 G | 1115 H | 1115I | 1115 J |
| 1118 A | 1118 B | 1118 C | 1118 D | 1118 E | 1118 F | 1118 G | 1118 H | 1118I | 1118 J |
| 1120 A | 1120 B | 1120 C | 1120 D | 1120 E | 1120 F | 1120 G | 1120 H | 1120I | 1120 J |
| 1123 A | 1123 B | 1123 C | 1123 D | 1123 E | 1123 F | 1123 G | 1123 H | 1123I | |
| 1125 A | 1125 B | 1125 C | 1125 D | 1125 E | 1125 F | 1125 G | 1125 H | 1125I | 1125 J |
| 1128 A | 1128 B | 1128 C | 1128 D | 1128 E | 1128 F | 1128 G | 1128 H | 1128I | |

CODING BLOCK BITSTREAM STRUCTURE AND SYNTAX IN VIDEO CODING SYSTEMS AND METHODS

CROSS-REFERENCE TO RELATED APPLICATIONS

This application is a continuation in part of previously filed PCT Application No. PCT/CN2015/075599, titled Motion Vector Selection and Prediction in Video Coding Systems and Methods, filed 31 Mar. 2015, the entire disclosure of which is hereby incorporated for all purposes.

TECHNICAL FIELD

This disclosure relates to encoding and decoding of video signals, and more particularly, to selecting predictive motion vectors for frames of a video sequence.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. There are many applications of digital multimedia including entertainment, information, medicine, and security, and have benefited the society in numerous ways. When initially captured by sensors such as cameras and microphones, multimedia data may be analog and then subsequently digitized, e.g., via a conventional pulse coded modulation (PCM) process. This process may create a significant amount of digital data. Thus, efficient communication, storage, and/or transmission of a large volume of digital multimedia content requires the digital multimedia to be compressed from its raw PCM form to a compressed representation. Many techniques for compressing multimedia have been developed. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for "on-demand" access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression.

Many video compression techniques utilize a general interframe predictive coding framework that involves reducing temporal redundancy by compensating for motion between frames of video. The basic concept is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures in display order, whereas B-type pictures may utilize information from both previous and future pictures in display order.

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference between the reference block and the current block is calculated to generate a residual (also referred to as a "residual signal"). Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g., using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded.

On the decoder side, inversed quantization and inversed transforms are applied to recover the spatial residual signal. These are typical transform/quantization process in all video compression standards. A reverse prediction process may then be performed in order to generate a recreated version of the original unencoded video sequence.

In certain conventional compression techniques, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame size, e.g., 64×64 pixels. However, because of the corresponding increases in resolution, it also may be desirable to be able to perform motion prediction and transformation on a relatively small scale, e.g., 4×4 pixels.

As the resolution of motion prediction increases, the amount of bandwidth required to encode and transmit motion vectors increases, both per frame and accordingly across entire video sequences.

BRIEF DESCRIPTION OF THE DRAWINGS

FIGS. 6a-6h are a conceptual illustration of various aspects of a video frame being encoded by the exemplary parallel encoder of FIG. 5 in accordance with at least one embodiment.

Figures 11C, 11D:
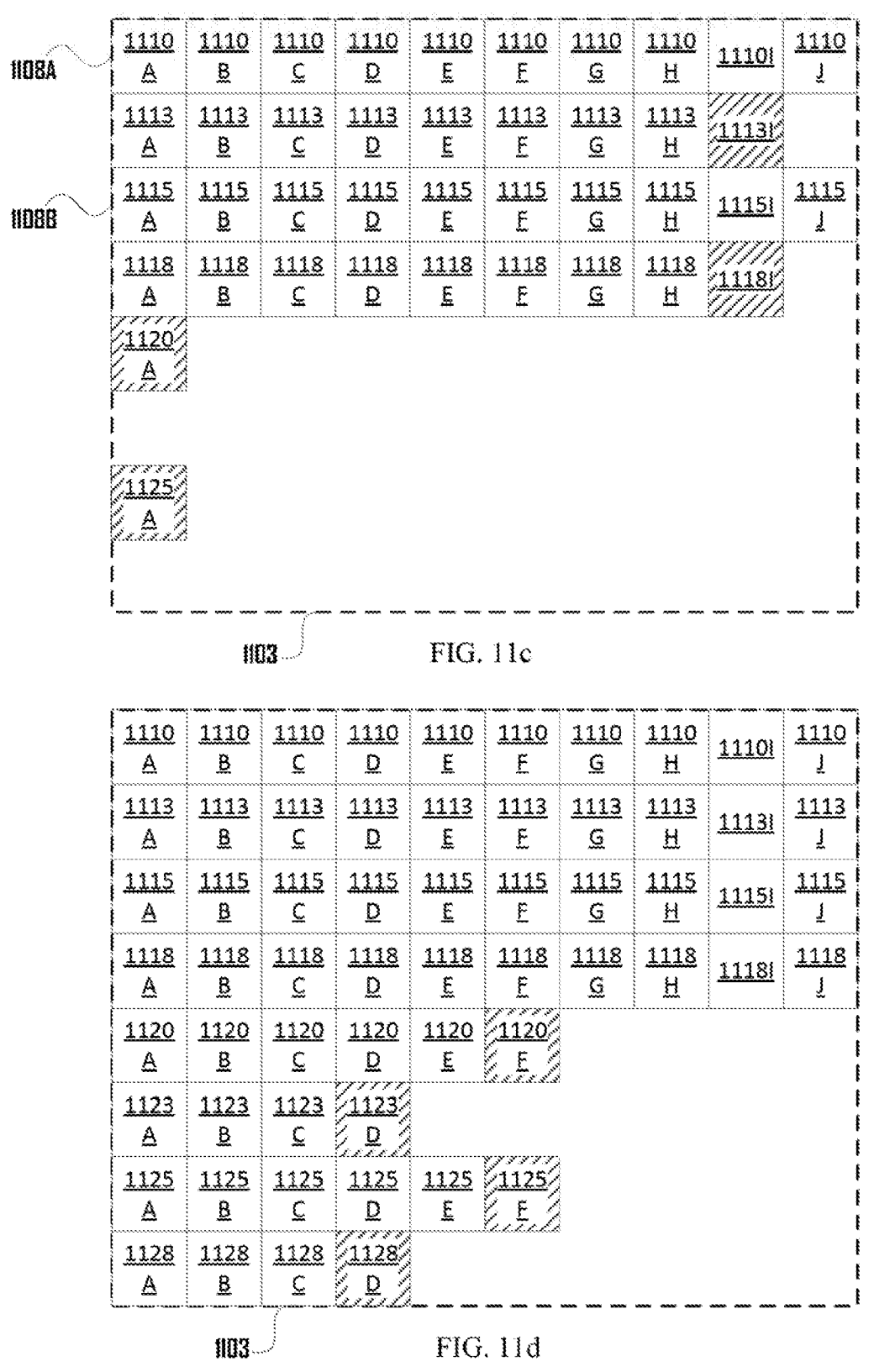

FIGS. 11a-11e are a conceptual illustration of various aspects of a video frame being decoded by the exemplary parallel decoder of FIG. 10 in accordance with at least one embodiment.

DESCRIPTION

Figure 1:
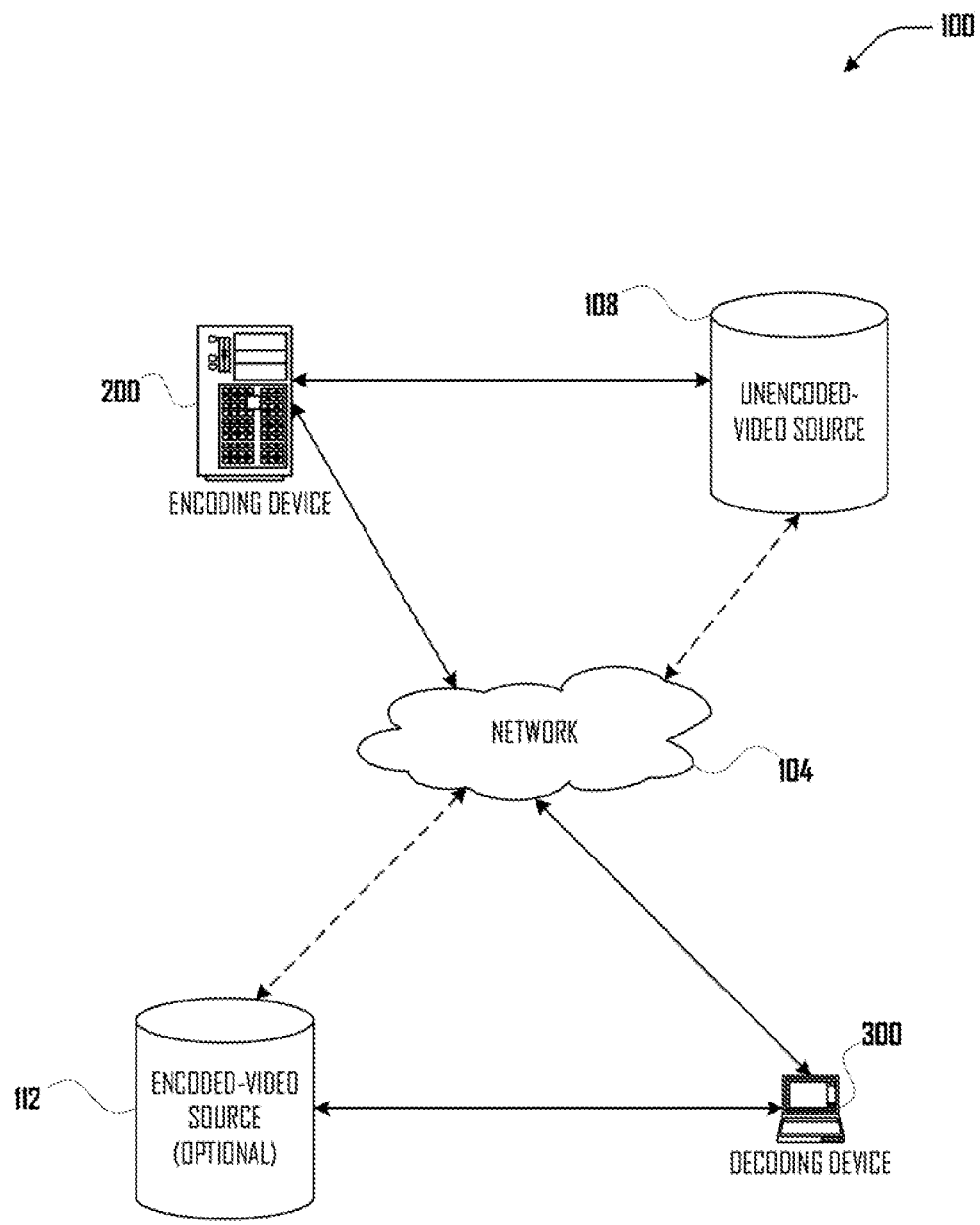
FIG. 1 illustrates an exemplary video encoding/decoding system according to at least one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope to the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Encoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, decoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200, may be a networked computing device, such as a server, generally capable of accepting requests over network 104, e.g., from decoding device 300, and providing responses accordingly. In various embodiments, decoding device 300 may be a networked client computing device having a form factor such as a mobile-phone; watch, glass, or other wearable computing device; a dedicated media player; a computing tablet; a motor vehicle head unit; an audio-video on demand (AVOD) system; a dedicated media console; a gaming device, a "set-top box," a digital video recorder, a television, or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
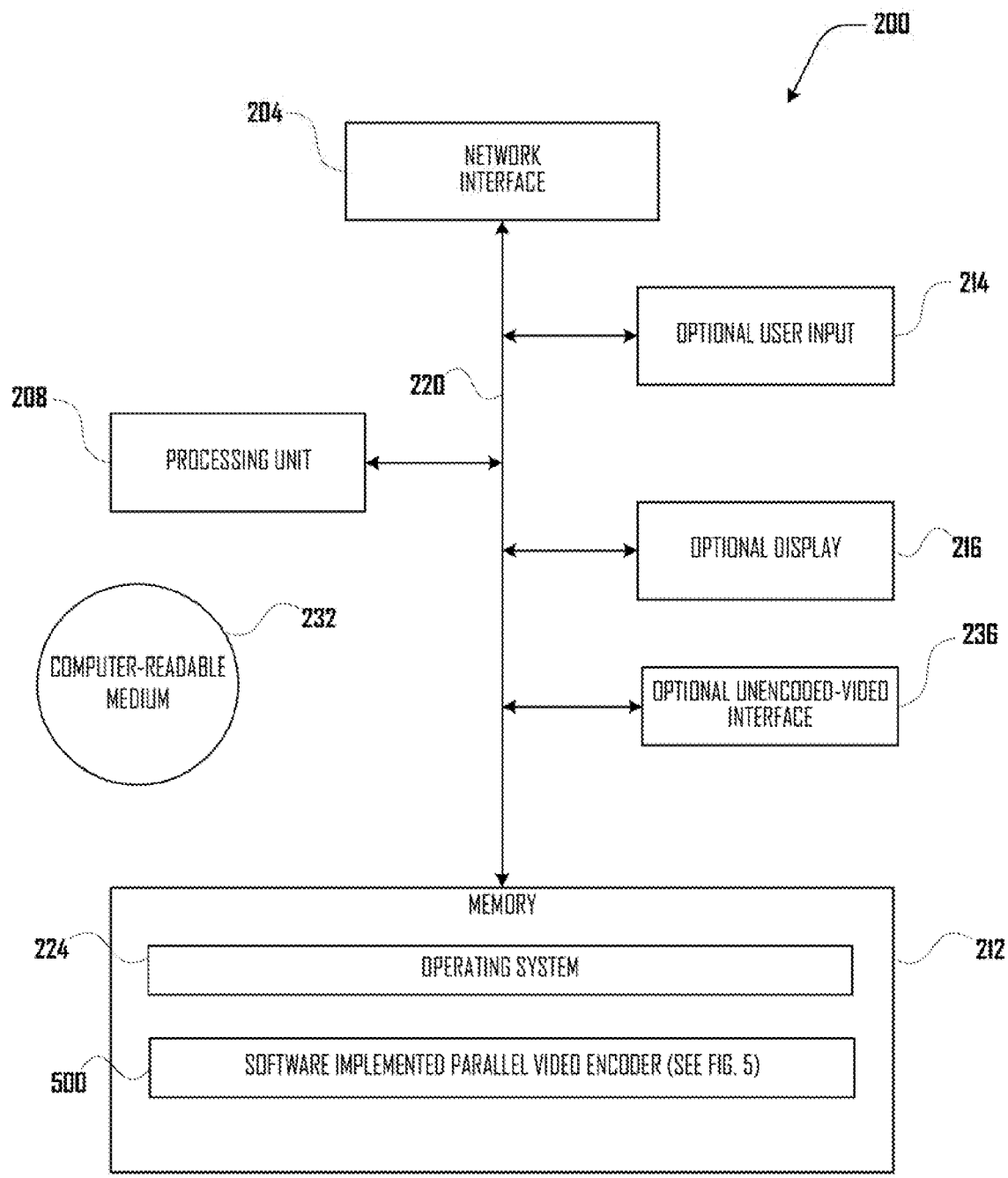
FIG. 2 illustrates several components of an exemplary encoding device, in accordance with at least one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g., an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 may store an operating system 224 as well as program code for a number of software services, such as software implemented parallel video encoder 500 (described below in reference to FIG. 5) with instructions for performing a motion-vector-selection routine. Memory 212 may also store video data files (not shown) which may represent unencoded or encoded copies of audio/visual media works, such as, by way of examples, movies and/or television episodes. These and other software components and data files may be loaded into memory 212 of encoding device 200 using a drive mechanism (not shown) associated with a non-transitory computer-readable medium 232, such as a floppy disc, tape, DVD/CD-ROM drive, memory card, or the like. Although an exemplary encoding device 200 has been described, an encoding device may be any of a great number of networked computing devices capable of communicating with network 104 and executing instructions for implementing video encoding software, such as exemplary software implemented parallel video encoder 500.

In operation, the operating system 224 manages the hardware and other software resources of the encoding device 200 and provides common services for software applications, such as software implemented video encoder 400. For hardware functions such as network communications via network interface 204, receiving data via input 214, outputting data via display 216, and allocation of memory 212 for various software applications, such as software implemented video encoder 400, operating system 224 may act as an intermediary layer between software executing on the encoding device and the hardware.

In some embodiments, encoding device 200 may further comprise an optional specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of encoding video, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
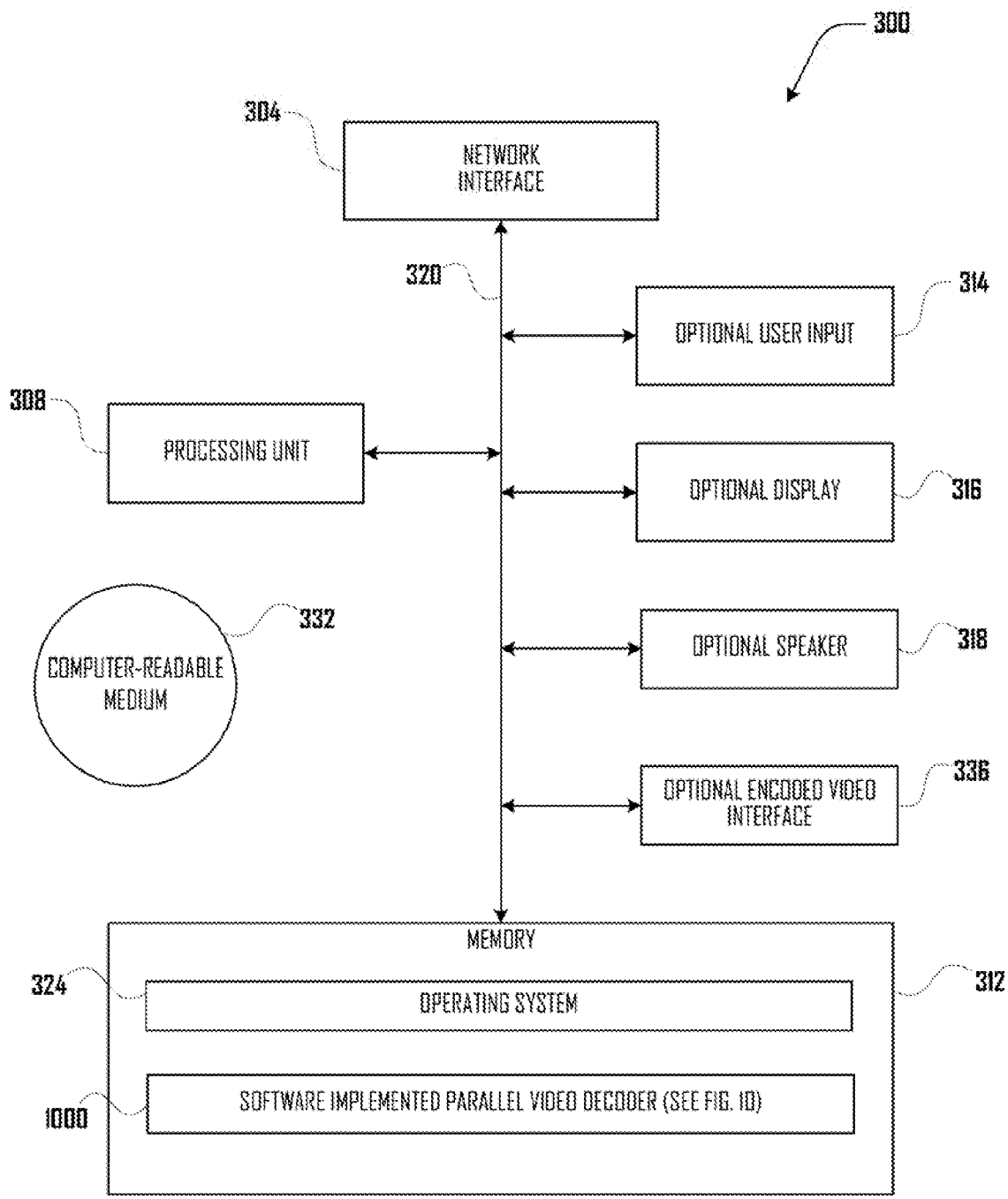
FIG. 3 illustrates several components of an exemplary decoding device, in accordance with at least one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g., an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented video decoder 1000 (described below in reference to FIG. 10) with instructions for performing motion-vector recovery routine. Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like. Although an exemplary decoding device 300 has been described, a decoding device may be any of a great number of networked computing devices capable of communicating with a network, such as network 104, and executing instructions for implementing video decoding software, such as exemplary software implemented video decoder 1000, and accompanying message extraction routine.

In operation, the operating system 324 manages the hardware and other software resources of the decoding device 300 and provides common services for software applications, such as software implemented video decoder 1000. For hardware functions such as network communications via network interface 304, receiving data via input 314, outputting data via display 316 and/or optional speaker 318, and allocation of memory 312, operating system 324 acts as an intermediary between software executing on the encoding device and the hardware.

In some embodiments, decoding device 300 may further comprise an optional encoded video interface 336, e.g., for communicating with encoded-video source 112, such as a high speed serial bus, or the like. In some embodiments, decoding device 300 may communicate with an encoded-video source, such as encoded video source 112, via network interface 304. In other embodiments, encoded-video source 112 may reside in memory 312 or computer readable medium 332.

Although an exemplary decoding device 300 has been described that generally conforms to conventional general purpose computing devices, an decoding device 300 may be any of a great number of devices capable of decoding video, for example, a video recording device, a video co-processor and/or accelerator, a personal computer, a game console, a set-top box, a handheld or wearable computing device, a smart phone, or any other suitable device.

Decoding device 300 may, by way of example, be operated in furtherance of the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Video Encoder

Figure 4:
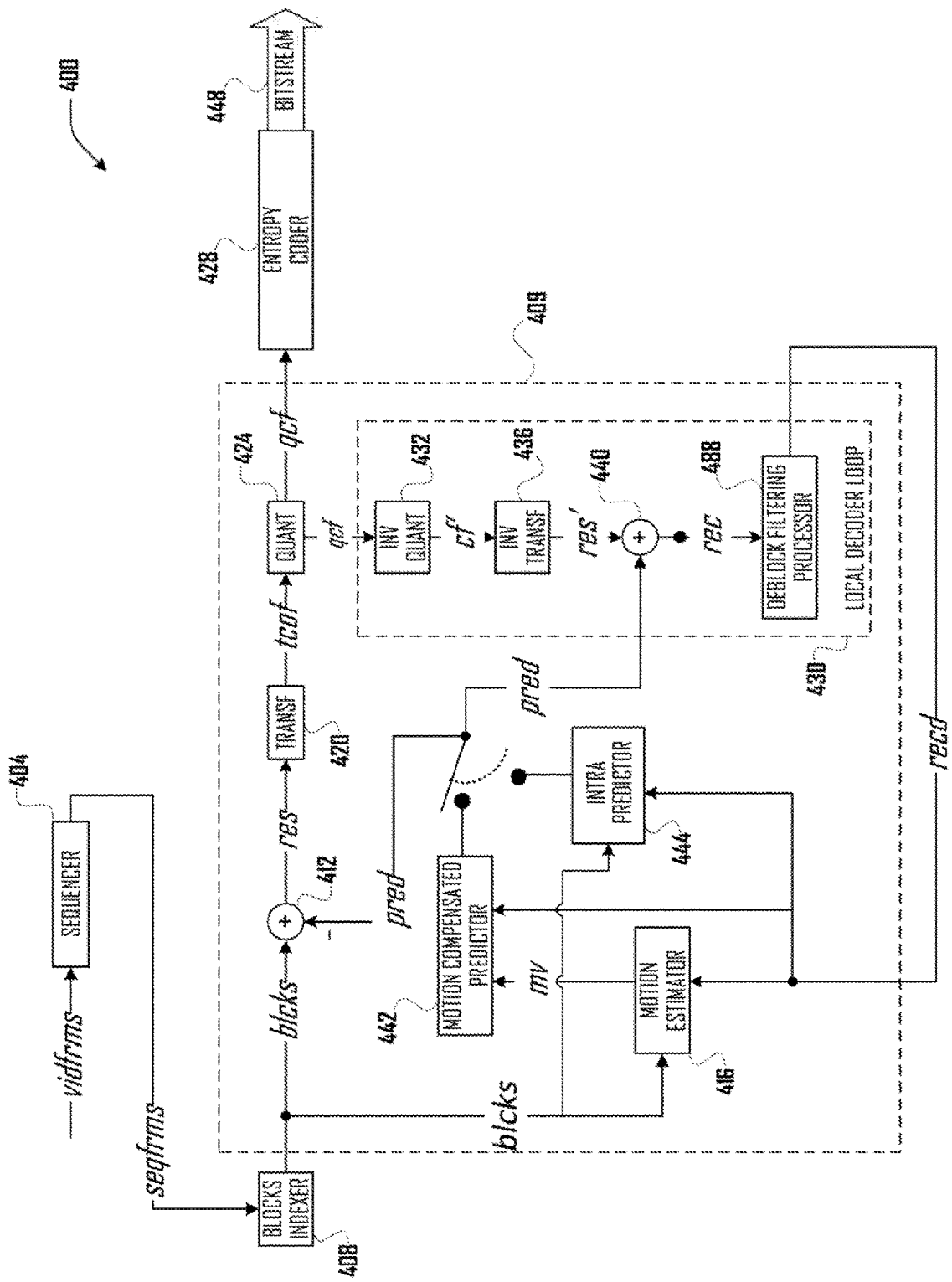
FIG. 4 illustrates a block diagram of an exemplary video encoder in accordance with at least one embodiment.

FIG. 4 shows a general functional block diagram of software implemented video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g., I, P, or B) to each unencoded video frame and reorder the sequence of frames, and/or groups of frames from the sequence of frames, into a coding order for interframe motion prediction purposes (e.g., I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g., sixty-four by sixty-four pixels) and divide the unencoded frame into an array of coding blocks (blks). Individual coding blocks within a given frame may vary in size, e.g., from four by four pixels up to the LCB size for the current frame.

Each coding block may then be provided to a prediction/transform unit 409. Each block (blcks) may be input one at a time to a differencer 412 and may be differenced with corresponding prediction signal blocks (pred) generated from previously encoded coding blocks. To generate the prediction blocks (pred), coding blocks (blcks) are also be provided to an intra predictor 444 and a motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

For intra-coded coding blocks, intra predictor 444 provides a prediction signal representing a previously coded area of the same frame as the current coding block. For an inter-coded coding block, motion compensated predictor 442 provides a prediction signal representing a previously coded area of a different frame from the current coding block.

At the beginning of local decoding loop 430, inverse quantizer 432 may de-quantize the quantized coefficients (qcf) and pass the resulting de-quantized coefficients (cf') to inverse transformer 436 to generate a de-quantized residual block (res'). At adder 440, a prediction block (pred) from motion compensated predictor 442 may be added to the de-quantized residual block (res') to generate a locally decoded block (rec). Locally decoded block (rec) may then be sent to a frame assembler and deblock filter processor 488, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bitstream 448. For each frame of the unencoded video sequence, encoded video bitstream 448 may include encoded picture data (e.g., the encoded quantized transform coefficients (qcf) and differential motion vectors (dmv)) and an encoded frame header (e.g., syntax information such as the LCB size for the current frame).

Software Implemented Parallel Video Encoder

Figure 5:
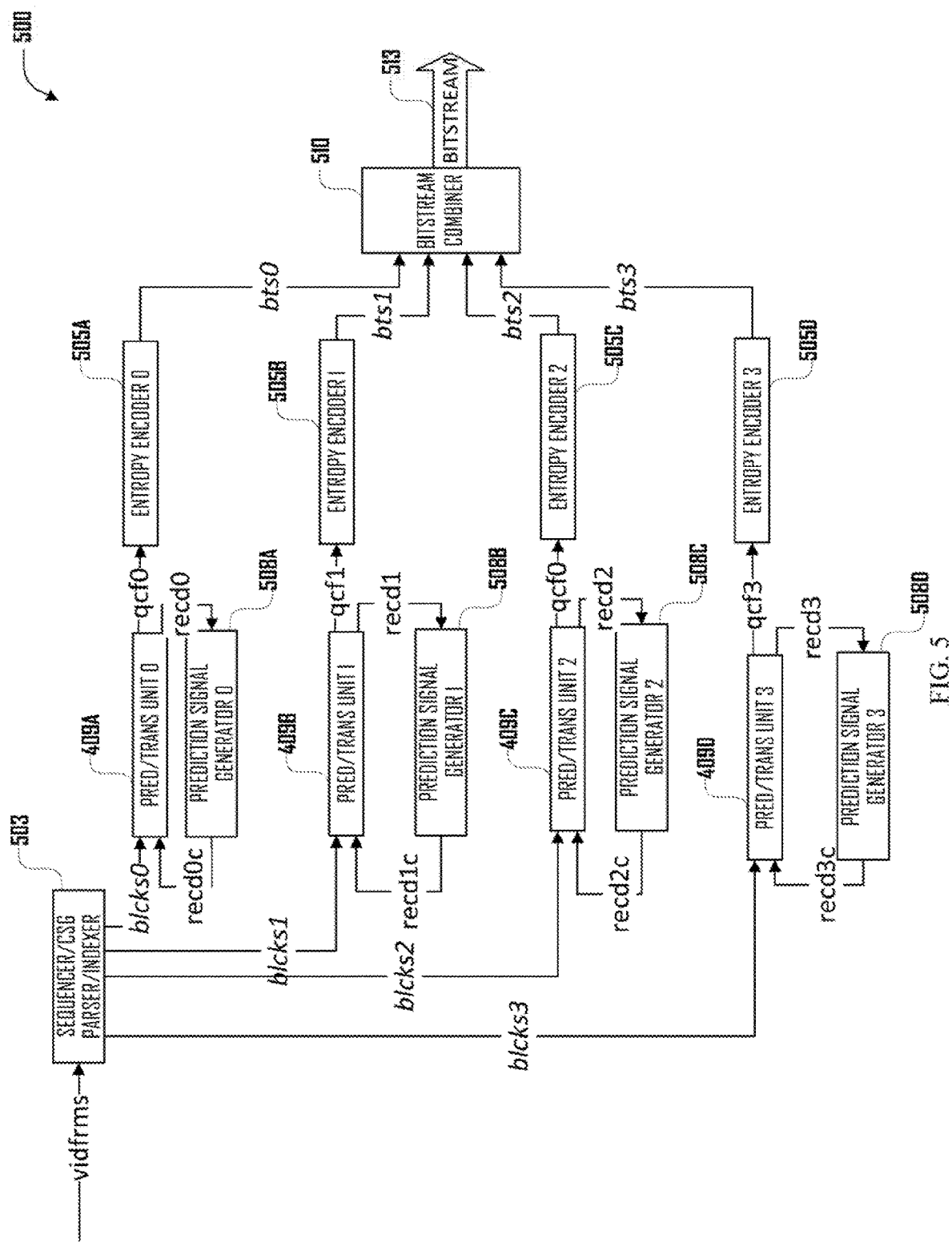
FIG. 5 illustrates a block diagram of an exemplary parallel video encoder in accordance with at least one embodiment.

Referring to FIG. 5, in accordance with various embodiments a software implemented parallel/multi-threaded video encoder 500 may include multiple prediction/transform units 409A-409D arranged in parallel to improve encoding efficiency. To take advantage of such an encoder design, additional coding structures, referred to as a coding stripe (CS) and a coding stripe group (CSG), may be utilized in encoding one or more unencoded video frames (vidfrms) of a video sequence. These coding structures may increase the parallel processing capability of encoder 400 (as well as decoder 500, as is explained below).

CSG Parser 503 may perform the function of sequencer 404 and blocks indexer 408 by assigning a predictive-coding picture-type (e.g., I, P, or B) to each unencoded video frame; reordering the sequence of frames, or groups of frames from the sequence of frames, into a coding order (e.g., I-type frames followed by P-type frames, followed by B-type frames); and determining a largest coding block ("LCB") size for the current frame. CSG parser 503 may then divide each unencoded video frame into an array of coding stripes (CSs) and coding stripe groups (CSGs).

Figure 6A:
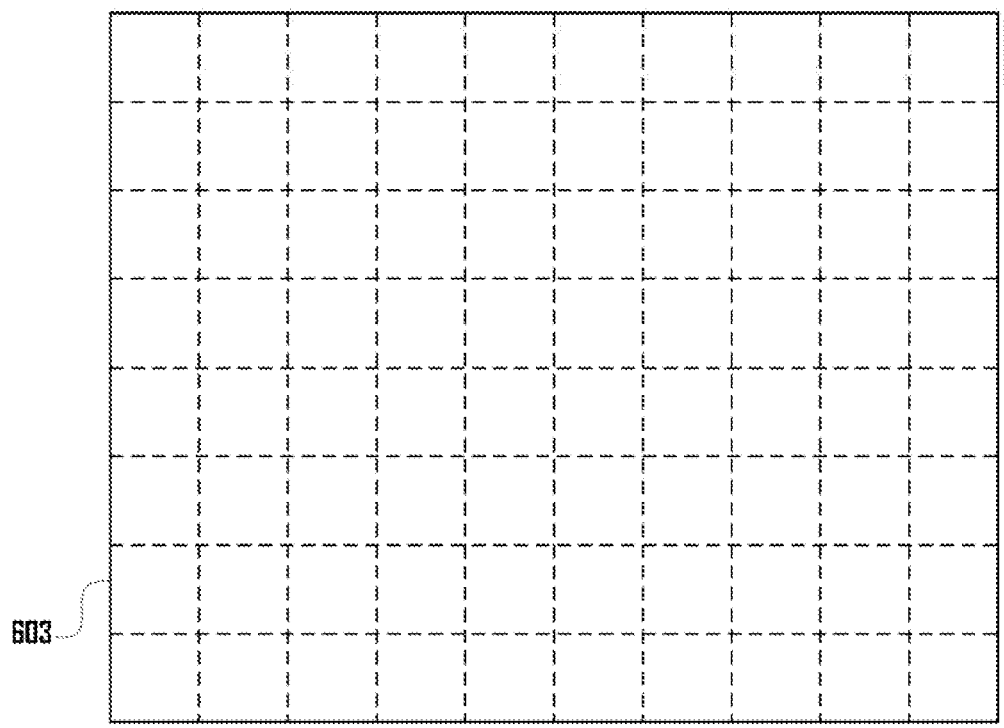
Figure 6B:
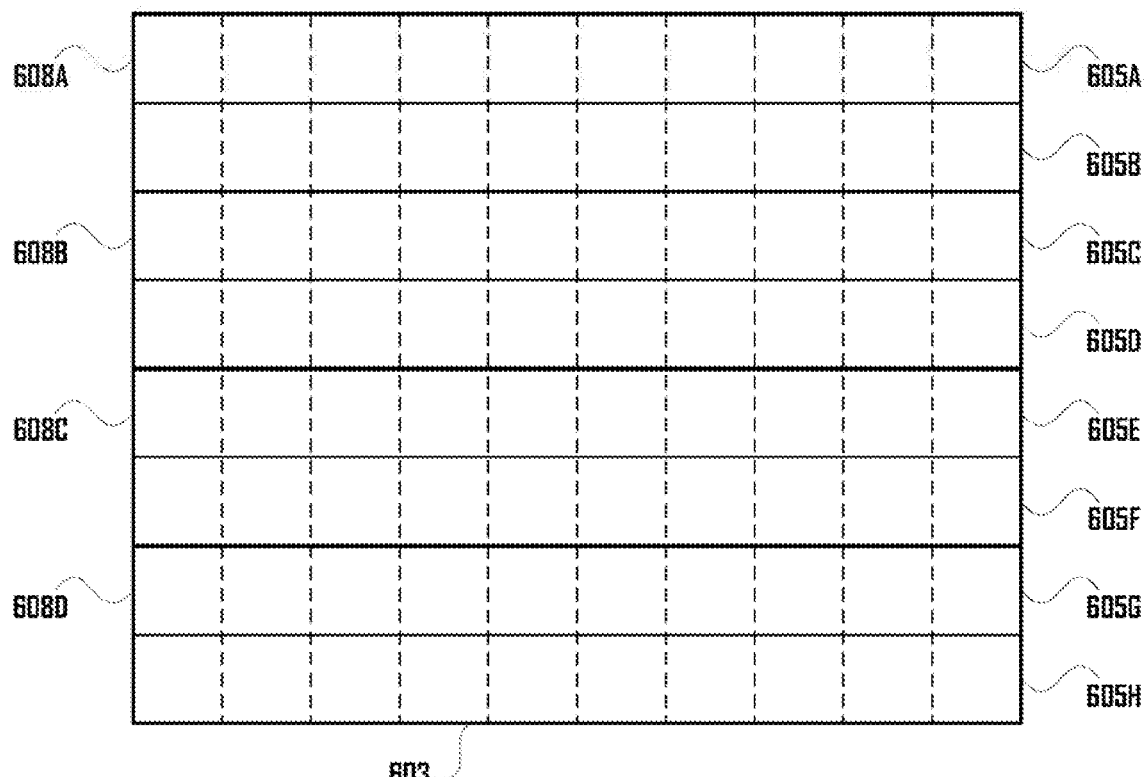
Figures 6E, 6F:
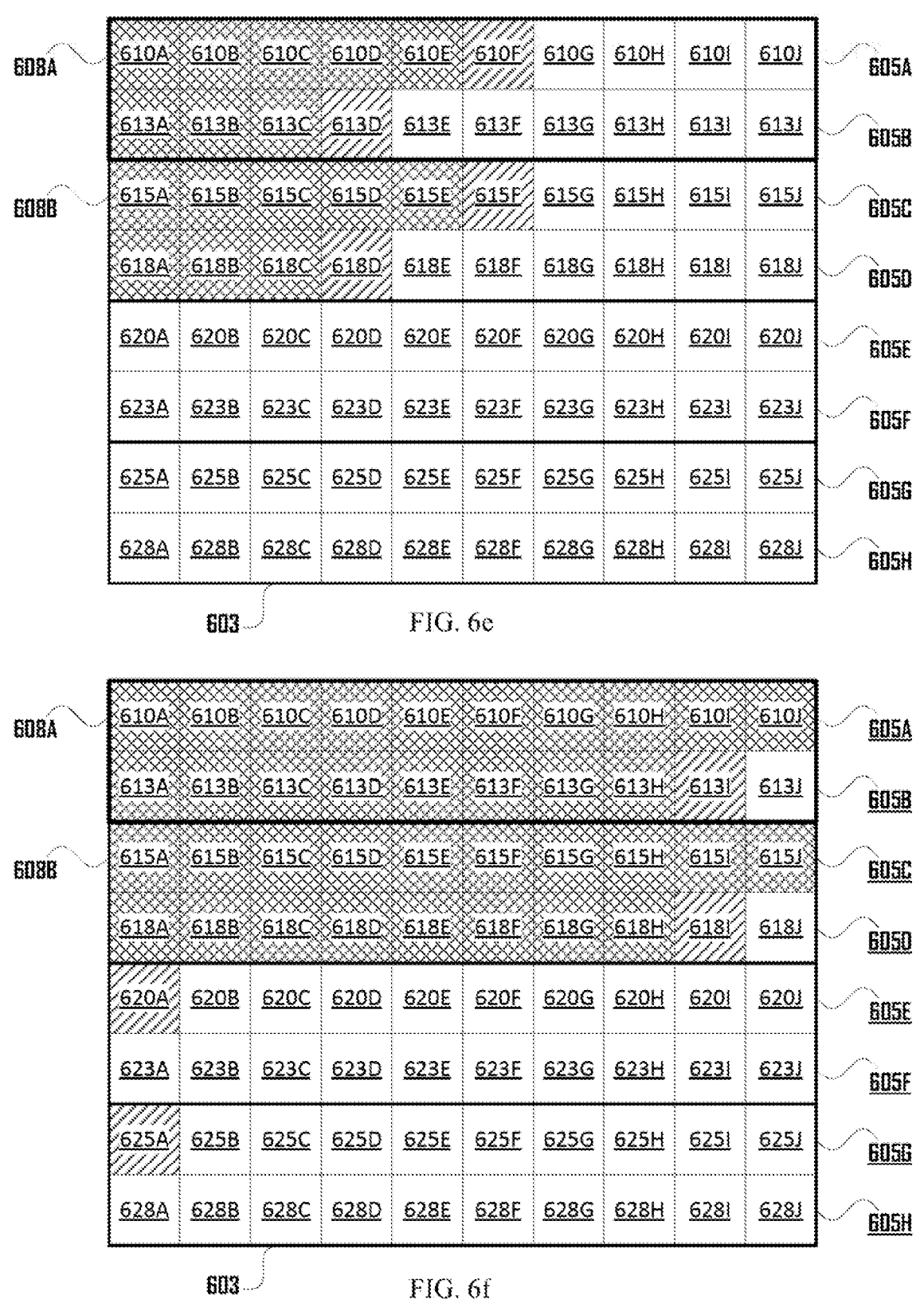
Figures 6G, 6H:
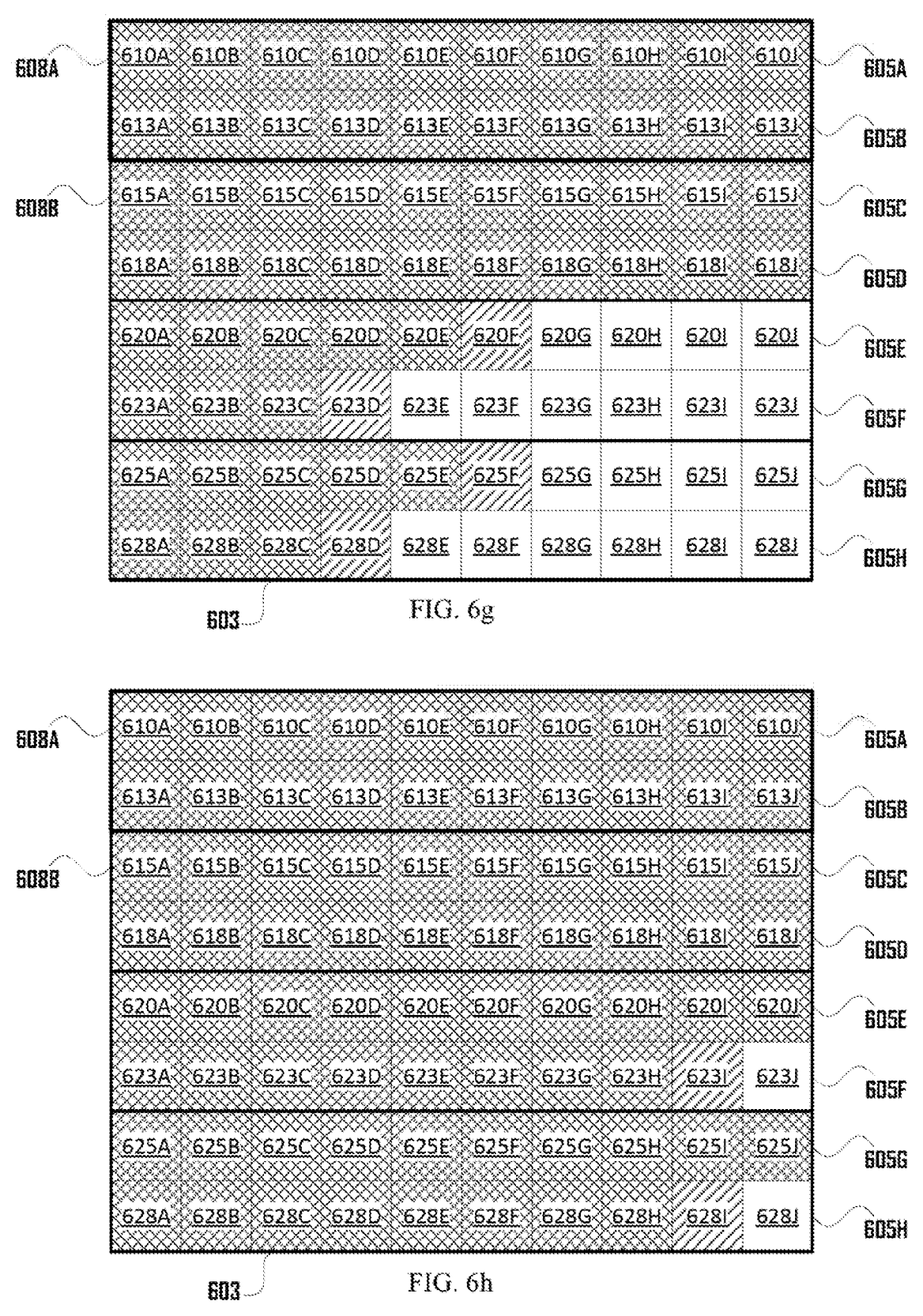

Referring also to FIG. 6a-6b by way of example, an unencoded video frame 603 (with the LCB size indicated by dotted lines) may be divided into an array of coding stripes 605A-605H, each coding stripe being the width of the video frame and one LCB high (note there may be multiple coding blocks within an area of the frame corresponding to a single LCB). As FIG. 6b shows, a coding stripe 605 consists of a row of LCBs. For example, a 1080p frame with an LCB size of 64×64 bits may have seventeen (1080/64) coding stripes of thirty (1920/64) LCBs each. Coding stripes 605A-605H may be grouped into one or more coding stripe groups (CSGs) 608A-608D.

In accordance with at least the present embodiment, the coding blocks (blcks) of video frame 603 may then be encoded such that (1) there is no inter-CS parsing dependency and (2) there is no inter-CSG reconstruction dependency. As is described in more detail below, an absence of inter-CS parsing dependency means all the information needed to separate a portion of an encoded bitstream corresponding to a given coding stripe into its constituent parts (e.g., frame headers, video data, etc.) is contained within the bitstream for that coding stripe; no data from outside the coding stripe is required. An absence of inter-CSG reconstruction dependency means the encoder may only encode coding blocks using information from other coding blocks within the current coding stripe group.

Referring now to FIG. 6c, CSG parser 503 may then allocate coding blocks of the video frame 603 amongst prediction/transform units 409A-409D. For example, the coding blocks corresponding to the first coding stripe of coding stripe group 608A, i.e., coding stripe 605A, may be provided to prediction/transform unit 409A and the coding blocks corresponding to the first coding stripe of coding stripe group 608B, i.e., coding stripe 605C, may be provided to prediction/transform unit 409B. After the first coding blocks of coding stripe 605A have been transformed and locally decoded by prediction/transform unit 409A, corresponding recovered blocks (recd) may be used in the prediction and transformation of additional coding blocks within coding stripe group 608A, i.e., coding stripes 605A and 605B. For example, the coding blocks corresponding to coding stripe 605A may continue to be provided to prediction/transform unit 409A and the coding block corresponding to coding stripe 605B may be provided to prediction/transform unit 409C. Similarly, after the first coding blocks of coding stripe 605C have been transformed and locally decoded by prediction/transform unit 409B, corresponding recovered blocks (recd) may be used in the prediction and transformation of additional coding blocks within coding stripe group 608B, i.e., coding stripes 605C and 605D. For example, the coding blocks corresponding to coding stripe 605C may continue to be provided to prediction/transform unit 409B and the coding block corresponding to coding stripe 605D may be provided to prediction/transform unit 409D.

FIGS. 6d-6g and Table 1 illustrate a simplified example of the encoding progress of video frame 603 using parallel encoder 500. In the present example, it is assumed that unencoded video frame 603 is divided into an array of LCB-sized coding blocks 610A-628J, the encoding of each block takes an equal amount of time, unencoded coding blocks are indicated by no cross-hatching, coding blocks being encoded in the current time slot are indicated by single cross-hatching, and already encoded blocks are indicated by double cross-hatching.

TABLE 1

| Time | Pred/Trans Unit 409A | Pred/Trans Unit 409B | Pred/Trans Unit 409C | Pred/Trans Unit 409D | See FIG. |
|---|---|---|---|---|---|
| 0  | 610A | 615A |      |      | 6d |
| 1  | 610B | 615B |      |      |    |
| 2  | 610C | 615C | 613A | 618A |    |
| 3  | 610D | 615D | 613B | 618B |    |
| 4  | 610E | 615E | 613C | 618C |    |
| 5  | 610F | 615F | 613D | 618D | 6e |
| 6  | 610G | 615G | 613E | 618E |    |
| 7  | 610H | 615H | 613F | 618F |    |
| 8  | 610I | 615I | 613G | 618G |    |
| 9  | 610J | 615J | 613H | 618H |    |
| 10 | 620A | 625A | 613I | 618I | 6f |
| 11 | 620B | 625B | 613J | 618J |    |
| 12 | 620C | 625C | 623A | 628A |    |
| 13 | 620D | 625D | 623B | 628B |    |
| 14 | 620E | 625E | 623C | 628C |    |
| 15 | 620F | 625F | 623D | 628D | 6g |
| 16 | 620G | 625G | 623E | 628E |    |
| 17 | 620H | 625H | 623F | 628F |    |
| 18 | 620I | 625I | 623G | 628G |    |
| 19 | 620J | 625J | 623H | 628H |    |
| 20 |      |      | 623I | 628I | 6h |
| 21 |      |      | 623J | 628J |    |

Quantized transform coefficient signals (qcf0-3) may be generated by each prediction/transform unit 409A-409D and provided to a corresponding entropy encoder 505A-505D. Entropy encoders 505A-505D may generate an encoded bitstreams (bts0-3), which are then combined by bitstream combiner 510 into a combined encoded bitstream 513, certain details of which are described below with in accordance with aspects of various embodiments. The recovered block signals (recd0-3) may be provided to an associated prediction signal generators 508A-508D. Prediction signal generators 508A-508D may each combine a recovered block signal (e.g., recd0) with data from other recovered block signals (e.g., recd1-3) into a combined prediction signal (e.g., recd0c), which may be provided back to respective prediction/transformation units 409A-409D.

Figure 7:
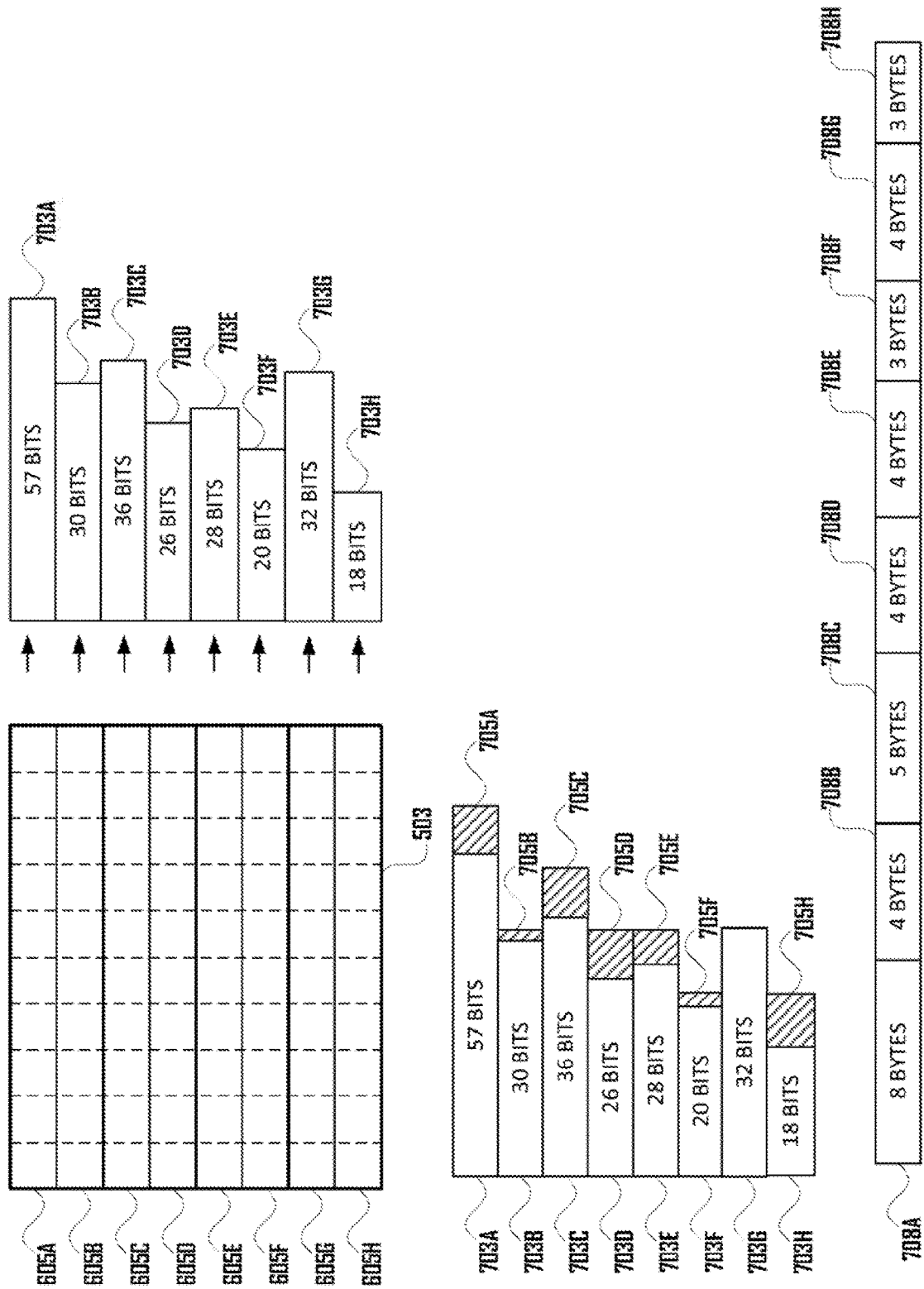
FIG. 7 is a conceptual illustration of various aspects of an encoded bitstream representing the video frame of FIGS. 6a-6h in accordance with at least one embodiment.

Referring to FIGS. 7a and 7b, the size of an encoded bitstream 703 corresponding to a coding stripe 605 may be increased with padding bits 705 to force the size of the encoded bitstream to be a multiple of 8 bits, e.g., 1 byte. In the example above, video frame 603 is divided into eight coding stripes 605A-605H, which may then be encoded as respective bitstreams 703A-703F. Padding bits 705A-705F and 705H may be added to encoded bitstreams 703A-703F and 703H to create byte aligned coding stripe bitstreams 708A-708H (note coding stripe bitstream 703G is already a multiple of 8 bits and therefore no corresponding padding bits are shown). Exemplary coding stripe bitstream sizes (chosen arbitrarily for purposes of illustration), corresponding numbers of padding bits, and byte aligned coding stripe bitstream sizes for coding stripes 605A-605H are shown in Table 2.

TABLE 2

| Coding Stripe | CS Bitstream Size (in bits) | Padding (in bits) | Byte Aligned Bitstream Size (in bytes) | Difference from previous bitstream size (in bytes) |
|---|---|---|---|---|
| 605A | 57 | 9 | 8 |    |
| 605B | 30 | 2 | 4 | 4  |
| 605C | 36 | 4 | 5 | −1 |
| 605D | 26 | 6 | 4 | 1  |
| 605E | 28 | 4 | 4 | 0  |
| 605F | 20 | 4 | 3 | 1  |
| 605G | 32 | 0 | 4 | −1 |
| 605H | 18 | 6 | 3 | 1  |

The length of the byte aligned coding stripe bitstream 708 for each coding stripe in a frame may be coded in the frame's picture header. However, rather than code the length of each coding stripe bitstream individually, the coding stripe bitstream lengths may be represented using the difference value between the length of the current coding stripe bitstream the length of the previous coding stripe bitstream length. In the current example, the respective bitstream lengths of byte aligned coding stripe bitstreams 708A-708H are 8 bytes, 4 bytes, 5 bytes, 4 bytes, 4 bytes, 3 bytes, 4 bytes, and 3 bytes. In accordance with various embodiments, the length encoded in the picture header of encoded bitstream 513 corresponding to coding stripe 603A may be 8, because it is the first coding stripe of the frame, the length encoded in the picture header of the encoded bitstream corresponding to coding stripe 603B may be 4 (8 bytes-4 bytes), the length encoded in the picture header of the encoded bitstream corresponding to coding stripe 603C may be −1 (4 bytes-5 bytes), the length encoded in the picture header of the encoded bitstream corresponding to coding stripe 603D may be 1 (5 bytes-4 bytes), the length of the bitstream for coding stripe 603E may be 0 (4 bytes-4 bytes), the length of the bitstream for coding stripe 603F may be 1 (4 bytes-3 bytes), the length encoded in the picture header of the encoded bitstream corresponding to coding stripe 603G may be −1 (3 bytes-4 bytes), and the length encoded in the picture header of the encoded bitstream corresponding to coding stripe 603H may be 1 (4 bytes-3 bytes).

In accordance with various embodiments, six bits may be used in the picture header to communicate the size of each coding stripe in the frame: one bit may be used to indicate a sign (i.e., positive or negative) of the coding stripe bitstream length difference and five bits may be used to indicate the magnitude of the coding stripe bitstream length difference. The picture header may also contain information relating to the number of coding stripe groups in a frame. For example, as is shown in Table 3, a two bit coding stripe group syntax flag may be used to indicate one of four possible coding stripe group configurations.

TABLE 3

| Coding Stripe Group Syntax Bit Value | Number of Coding Stripe Groups |
|---|---|
| 00 | 1 |
| 01 | 2 |
| 10 | 4 |
| 11 | 8 |

In order to permit decoders to access information related to the picture quickly, various data elements, such as picture type (I, P, or B-type), picture width/height information, picture order count (PON), and the like may also be located at byte-aligned positions in the picture header of the encoded bitstream, thereby enabling a decoder to access this information without decoding the picture header.

Figure 8:
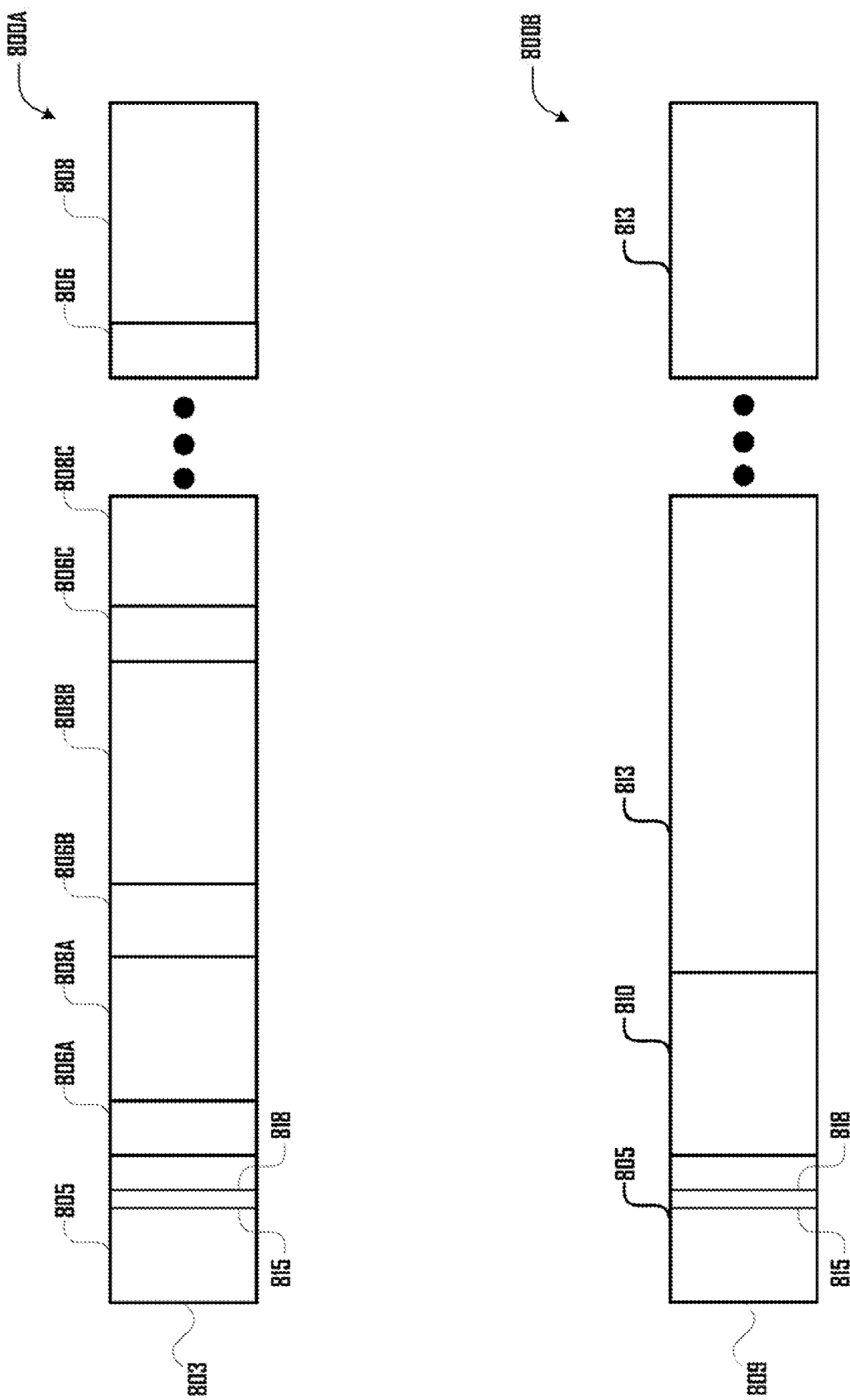
FIG. 8 is a conceptual illustration of various aspects of an encoded bitstream representing a video frame encoded in accordance with at least one embodiment.

Referring to FIG. 8, in accordance with at least one embodiment, an encoder, such as encoder 400 or encoder 500, may select between at least two output bitstream formats: a non-condensed header format 800A and a condensed header format 800B.

In non-condensed header format 800A, a bitstream 803 corresponding to a complete frame may include a picture header 805, followed by a first coding block header 806A for the first coding block of the frame, followed by a first residual data block 808A corresponding to the image data for the first coding block of the frame, followed by a second coding block header 806B for the second coding block, followed by a second residual data block 808B corresponding to the image data for the second coding block, followed by a third coding block header 806C for the third coding block, followed by a third residual data block 808C corresponding to the image data for the third coding block, followed by an nth coding block header 806 for the nth coding block, followed by an nth residual data block 808 corresponding to the image data for the nth coding block, etc.

In condensed header format 800B, a bitstream 809 corresponding to a complete frame may include a picture header 805, followed by a condensed coding block header 810, including all the header information for all the coding blocks of the frame, followed by a condensed residual data block 813, including all the image data for the frame.

A single bit condensed-header flag 815 in the picture header may be used to signal to a decoder which bitstream format to expect.

In accordance with other aspects of various embodiments, an encoder, such as encoder 400 or encoder 500, may include a code word 818 to indicate the LCB size for the current frame. For example, code word 818 may have two possible values with the first value indicating to a decoder that the LCB size for the current frame is 64×64 and the second value indicating to an encoder that the LCB sized for the current frame is 128×128.

In accordance with other aspects of various embodiments, each prediction block header may include a code word to indicate the temporal direction the prediction signal originates from with respect to the current frame. For example, the code word may have three possible values with the first value indicating a bi-directional prediction signal, the second value indicating prediction signal from a temporally previous picture, and the third value indication a prediction signal for a temporally future picture.

Software Implemented Decoder

Figure 9:
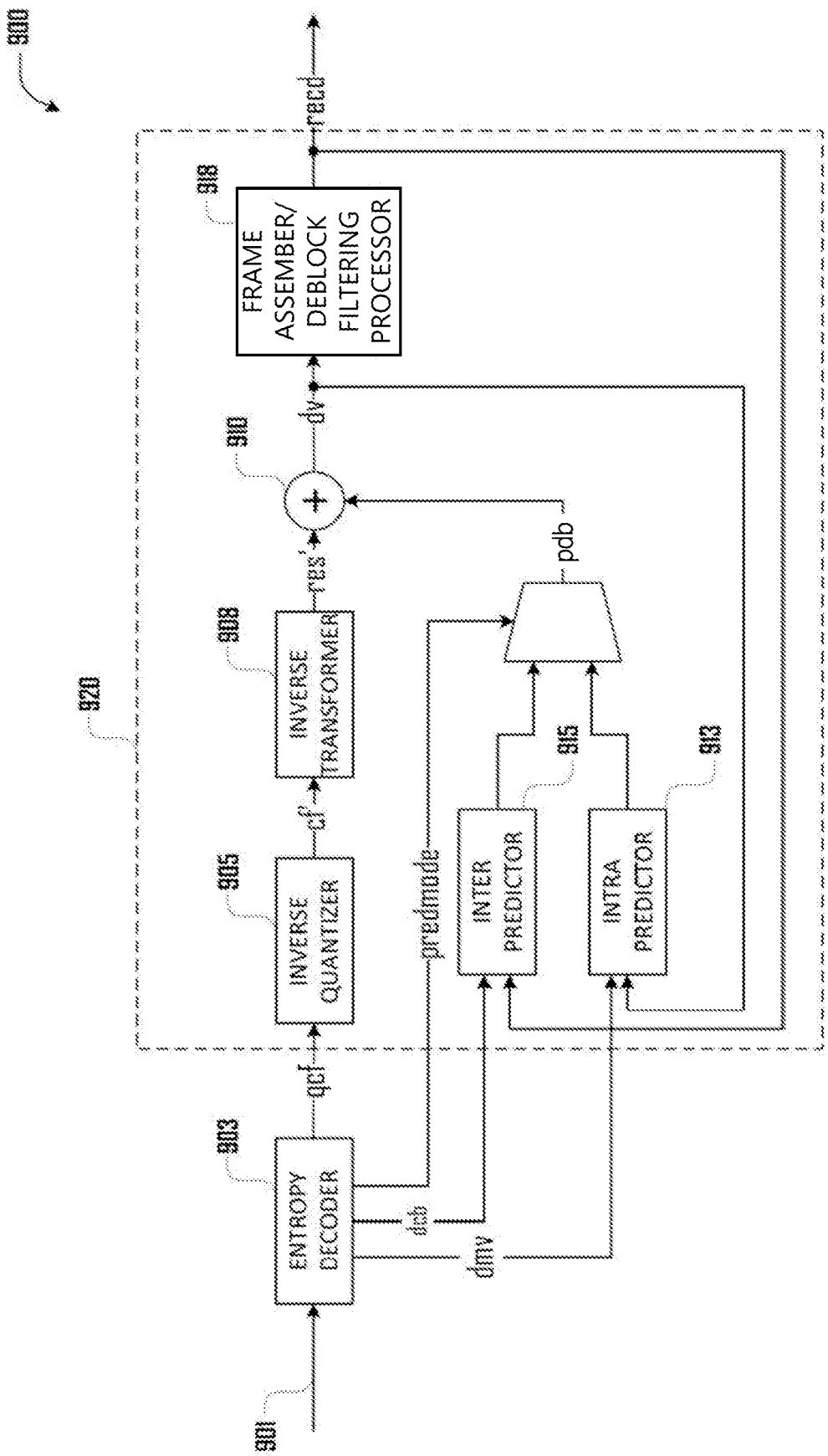
FIG. 9 illustrates a block diagram of an exemplary video decoder in accordance with at least one embodiment.

FIG. 9 illustrates a general functional block diagram of a corresponding software implemented video decoder 900 (hereafter "decoder 900") in accordance with various embodiments and being suitable for implementation by a decoding device, such as decoding device 300. Decoder 900 may work similarly to the local decoder loop 430 of encoder 400.

Specifically, an encoded video bitstream 901 may be provided to an entropy decoder 903, which may generate corresponding blocks of quantized coefficients (qcf), prediction information (dmv and dcb) for intra and inter-coded coding blocks, and other data, including the prediction mode (e.g., intra or inter) used to encode the current frame. The quantized coefficient blocks (qcf) may then be reorganized by an inverse quantizer 905, resulting in recovered transform coefficient blocks (cf'). Recovered transform coefficient blocks (cf') may then be inverse transformed out of the frequency-domain by an inverse transformer 908, resulting in decoded residual blocks (res'). An adder 910 may add prediction difference blocks (pdb) obtained by either an intra predictor 913 or an inter predictor 915. The resulting decoded video (dv) may be provided to intra predictor 913 and to a deblock filter 918. Recovered blocks (recd) at the output of deblock filter 918 may form a reconstructed frame of the video sequence, which may be output from the decoder 900 and also provided inter predictor 915 for decoding subsequent coding blocks.

Software Implemented Parallel Video Encoder

Figure 10:
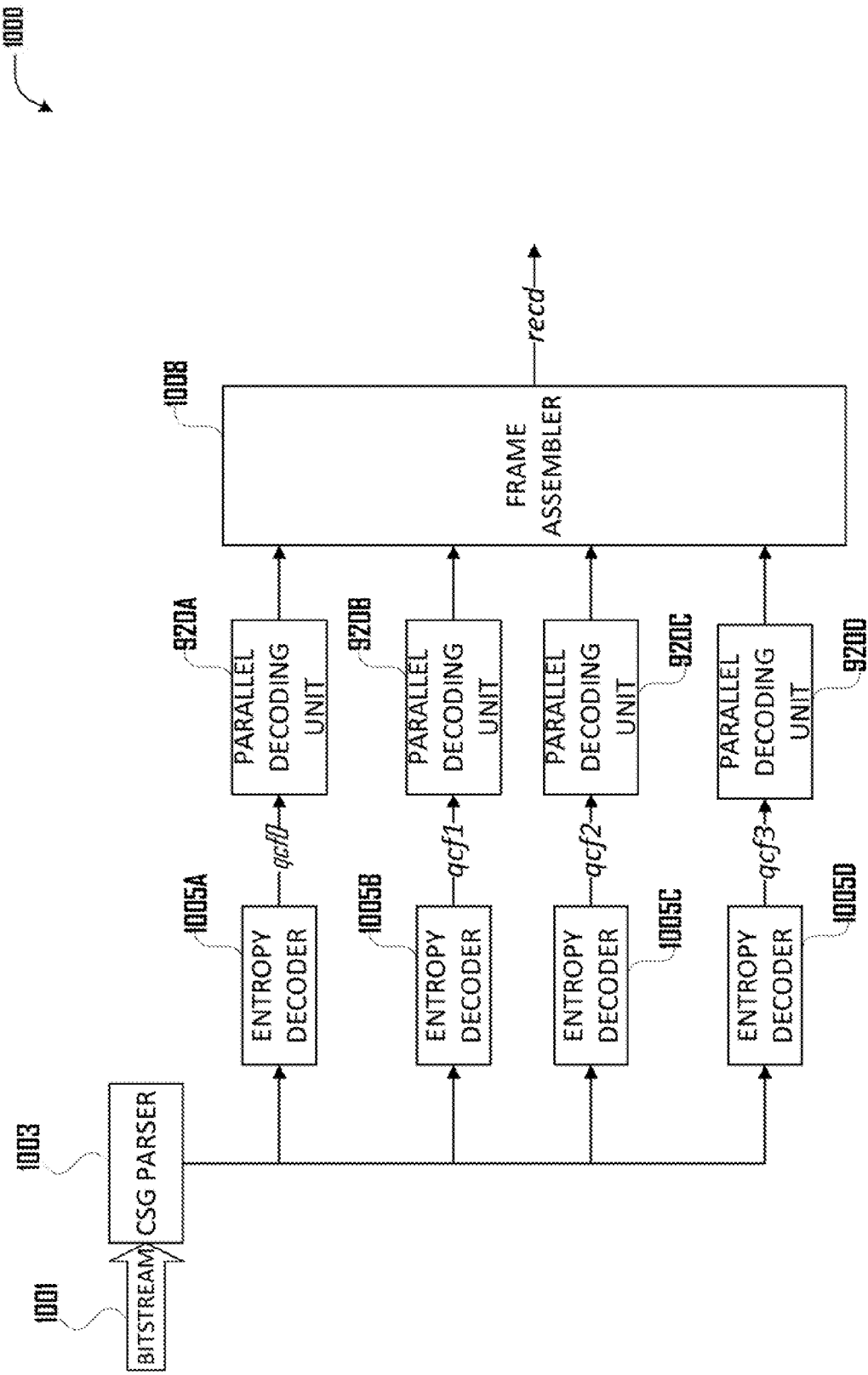
FIG. 10 illustrates a block diagram of an exemplar parallel video decoder in accordance with at least one embodiment.
Figure 11A:
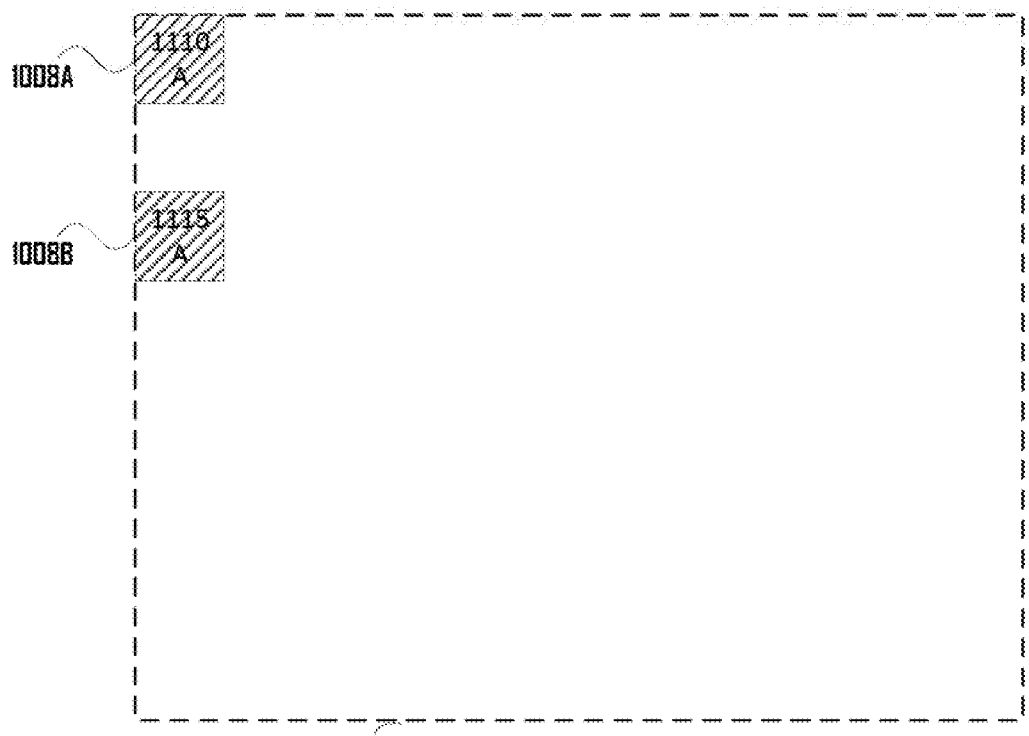
Figure 11B:
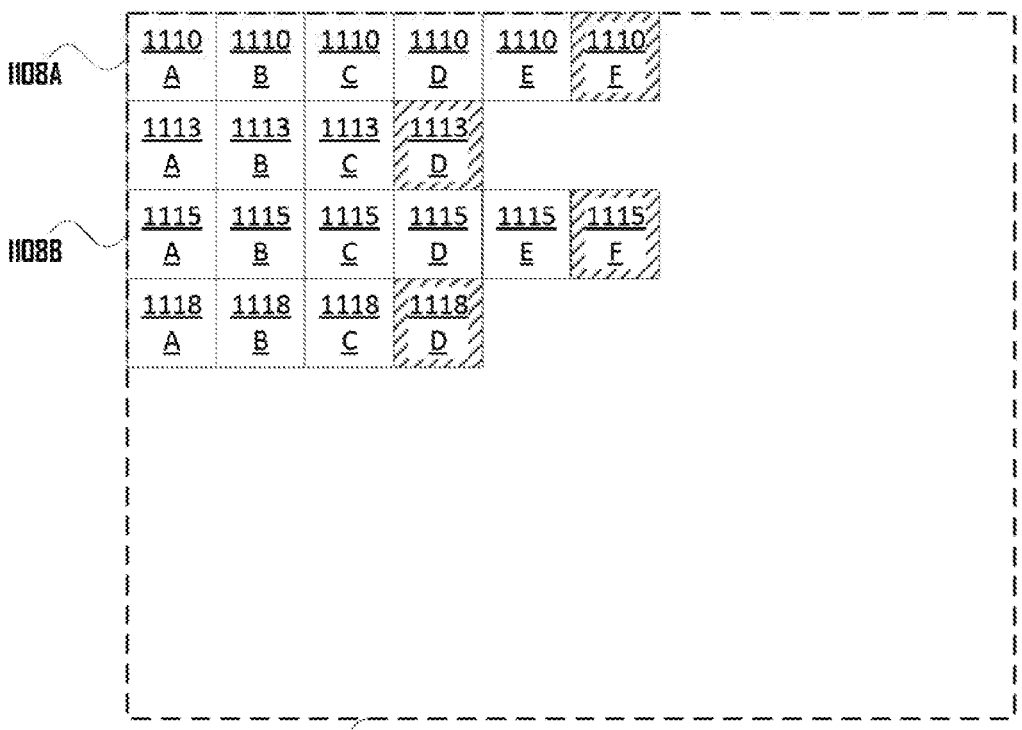

FIG. 10 illustrates a software implemented parallel/multi-threaded video decoder 1000 (hereafter "parallel decoder 1000") in accordance with various embodiments. As with decoder 900, an encoded bitstream 1001 is provided to CSG parser 1003, where it is divided among entropy decoders 1005A-1005D. Entropy decoders 1005A-1005D may generate corresponding blocks of quantized coefficients (qcf0-3), prediction information for intra and inter-coded coding blocks, and other data, including the prediction mode (e.g., intra or inter) used to encode the current frame As is described above in the context of encoder 400 and parallel encoder 500 as well as FIG. 8, in accordance with various embodiments, when receiving an encoded bitstream corresponding to a video frame, parallel decoder 1000 may examine the picture header portion of the bitstream to determine whether the encoded bitstream was encoded using a non-condensed header format 800A or a condensed header format 800B. Parallel decoder 1000 may also examine the picture header to determine information such as picture type (I, P, or B-type), picture width/height information, picture order count (PON), which may be located at known, at byte-aligned positions in the picture header of the encoded bitstream. Parallel decoder 1000 may also obtain information relating to the number of coding stripe groups in the encoded bitstream from a two bit coding stripe group syntax flag in the picture header (see Table 3, above) and the byte-aligned length of the coding stripes (see FIG. 7, described above).

In a similar, but reversed, process as is described above with respect to parallel encoder 500, CSG Parser 1003 may extract byte aligned coding stripe bitstreams by coding stripe group and assign coding stripe bitstreams to one of parallel decoding units 920A-920D. Each parallel decoding unit 920 functions similarly to decoder 900, whose output is provided to frame assembler 1008 to assemble a recovered frame (recd).

FIGS. 11a-11e and Table 4 illustrate a simplified example of the decoding progress of an encoded bitstream representing a video frame 1103 using parallel decoder 1000. In the present example, video frame 1103 may be a recreated version of video frame 603, described above. It is assumed that unencoded video frame 1103 was encoded such that the frame is divided into an array of LCB-sized coding blocks 1110A-1128J, the decoding of each block takes an equal amount of time, decoded coding blocks are indicated by no cross-hatching and coding blocks being decoded in the current time slot are indicated by single cross-hatching. CSG parser may assign parallel decoding unit 920A to decode the coding blocks corresponding to coding stripe 0 and assign parallel decoding unit 920B to decode the coding blocks corresponding to coding stripe 2.

TABLE 4

| Time | Parallel Decoding Unit 920A | Parallel Decoding Unit 920B | Parallel Decoding Unit 920C | Parallel Decoding Unit 920D | See FIG. |
|---|---|---|---|---|---|
| 0 | 1110A | 1115A | | | 11a |
| 1 | 1110B | 1115B | | | |
| 2 | 1110C | 1115C | 1113A | 1118A | |
| 3 | 1110D | 1115D | 1113B | 1118B | |
| 4 | 1110E | 1115E | 1113C | 1118C | |
| 5 | 1110F | 1115F | 1113D | 1118D | 11b |
| 6 | 1110G | 1115G | 1113E | 1118E | |
| 7 | 1110H | 1115H | 1113F | 1118F | |
| 8 | 1110I | 1115I | 1113G | 1118G | |
| 9 | 1110J | 1115J | 1113H | 1118H | |
| 10 | 1120A | 1125A | 1113I | 1118I | 11c |
| 11 | 1120B | 1125B | 1113J | 1118J | |
| 12 | 1120C | 1125C | 1123A | 1128A | |
| 13 | 1120D | 1125D | 1123B | 1128B | |
| 14 | 1120E | 1125E | 1123C | 1128C | |
| 15 | 1120F | 1125F | 1123D | 1128D | 11d |
| 16 | 1120G | 1125G | 1123E | 1128E | |
| 17 | 1120H | 1125H | 1123F | 1128F | |
| 18 | 1120I | 1125I | 1123G | 1128G | |
| 19 | 1120J | 1125J | 1123H | 1128H | |
| 20 | | | 1123I | 1128I | 11e |
| 21 | | | 1123J | 1128J | |

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. An encoding method, comprising:
receiving an unencoded video frame;
determining a largest coding block size for the unencoded video frame;
dividing the unencoded video frame into an array of coding stripes based on the largest coding block size, each coding stripe includes a row of coding blocks in the unencoded video frame where a width of the coding stripe is equal to a width of the unencoded video frame and a height of the coding stripe is equal to a height of the largest coding block size;
grouping the array of coding stripes into a first coding stripe group of a first plurality of adjacent coding stripes and a second coding stripe group of a second plurality of adjacent coding stripes, wherein the first coding stripe group includes at least a first coding stripe and a second coding stripe and the second coding stripe group includes at least a third coding stripe and a fourth coding stripe;
generating a first quantized transform coefficient signal for the first coding stripe of the first coding stripe group in parallel with generating a third quantized transform coefficient signal for the third coding stripe of the second coding stripe group, wherein the generation of the first and third quantized transform coefficient signals is performed without inter-coding stripe parsing dependency and without inter-coding stripe group reconstruction dependency;
generating a second quantized transform coefficient signal for the second coding stripe of the first coding stripe group in parallel with generating a fourth quantized transform coefficient signal for the fourth coding stripe of the second coding stripe group, wherein the generation of the second and fourth quantized transform coefficient signals is performed without inter-coding stripe parsing dependency and without inter-coding stripe group reconstruction dependency;
generating an encoded bitstream for each corresponding coding stripe from each corresponding quantized transform coefficient signal for the corresponding coding stripe; and
combining the encoded bitstreams from each coding stripe into a combined encoded bitstream as an encoded video frame of the unencoded video frame.

2. The encoding method of claim 1, wherein the generating of the first quantized transform coefficient signal for the first coding stripe without inter-coding stripe parsing dependency includes:
generating the first quantized transform coefficient signal for the first coding stripe in the first coding stripe group such that information needed to separate a portion of a correspondingly encoded bitstream for the first coding stripe into its constituent parts is contained within the correspondingly encoded bitstream for the first coding stripe.

3. The encoding method of claim 1, wherein the generating of the first quantized transform coefficient signals for the first coding stripe without inter-coding stripe group reconstruction dependency includes:
generating the first quantized transform coefficient signal for the first coding stripe in the first coding stripe group using information from other coding blocks in the first coding stripe group.

4. The encoding method of claim 1, wherein generating the first quantized transform coefficient signal for the first corresponding coding stripe includes:
generating corresponding recovered blocks in response to transforming and locally decoding coding blocks for the first coding stripe; and
generating the first quantized transform coefficient signal for subsequent blocks in the first coding stripe using the corresponding recovered blocks.

5. The encoding method of claim 1, wherein generating the second quantized transform coefficient signal for the second coding stripe in the first coding stripe group includes:
generating first corresponding recovered blocks in response to transforming and locally decoding first coding blocks for the first coding stripe;
generating second corresponding recovered blocks in response to transforming and locally decoding second coding blocks for the second coding stripe; and
generating the second quantized transform coefficient signal for subsequent blocks in the second coding stripe using the first and second corresponding recovered blocks.

6. The encoding method of claim 1, wherein generating the second quantized transform coefficient signal for the second coding stripe in the first coding stripe group includes:
employing a first prediction and transform unit to generate the first quantized transform coefficient signal for the first coding stripe of the first coding stripe group; and
separately employing a second prediction and transform unit to generate the second quantized transform coefficient signal for the second coding stripe of the first coding stripe group.

7. The encoding method of claim 1, wherein generating quantized transform coefficient signals includes:
employing a first prediction and transform unit to generate the first quantized transform coefficient signal for the first coding stripe of the first coding stripe group; and separately employing a second prediction and transform unit in parallel to the first prediction and transform unit to generate the third quantized transform coefficient signal for the third coding stripe of the second coding stripe group.

8. The encoding method of claim 7, wherein generating the quantized transform coefficient signals includes:
employing a third prediction and transform unit to generate the second quantized transform coefficient signal for the second coding stripe of the first coding stripe group; and
separately employing a fourth prediction and transform unit in parallel to the third prediction and transform unit to generate the fourth quantized transform coefficient signal for the fourth coding stripe of the second coding stripe group.

9. The encoding method of claim 1, wherein generating the encoded bitstream for each corresponding coding stripe includes at least one of:
adding padding bits to each encoded bitstream to cause a size of the encoded bitstream to be a multiple of eight bits;
encoding a size of each encoded bitstream for each coding stripe into a header of the encoded video frame; or
encoding information relating to a number of coding stripe groups into the header of the encoded video frame.

10. The encoding method of claim 9, wherein encoding the size of each encoded bitstream for each coding stripe into the header includes:
for each current coding stripe bitstream:
determining a difference value between a length of the current coding stripe bitstream and a length of a previous coding stripe bitstream; and
encoding the difference value for each coding stripe bitstream into the header of the encoded video frame.

11. An encoding system, comprising:
a parser configured to:
receive an unencoded video frame;
determine a largest coding block size for the unencoded video frame; and
divide the unencoded video frame into an array of adjacent coding stripes based on a height of the largest coding block size, each coding stripe including a row of coding blocks in the unencoded video frame where a width of the coding stripe is equal to a width of the unencoded video frame and a height of the coding stripe is equal to the largest coding block size, the array of coding stripes being grouped into a first coding stripe group of a first plurality of adjacent coding stripes and a second coding stripe group of a second plurality of adjacent coding stripes, wherein the first coding stripe group includes at least a first coding stripe and a second coding stripe and the second coding stripe group includes at least a third coding stripe and a fourth coding stripe;
a plurality of prediction/transform units communicatively coupled to the parser and arranged in parallel to generate corresponding quantized transform coefficient signals for corresponding coding stripes without inter-coding stripe parsing dependency and without inter-coding stripe group reconstruction dependency, the plurality of prediction/transform units includes a first prediction/transform unit, a second prediction/transform unit, a third prediction/transform unit, and a fourth prediction/transform unit:
the first prediction/transform unit is configured to:
receive the first coding stripe of the first coding stripe group from the parser; and
generate, in parallel with the third prediction/transform unit, a first quantized transform coefficient signal for the first coding stripe;
the second prediction/transform unit is configured to:
receive the second coding stripe of the first coding stripe group from the parser; and
generate, in parallel with the fourth prediction/transform unit, a second quantized transform coefficient signal for the second coding stripe;
the third prediction/transform unit is configured to:
receive the third coding stripe of the second coding stripe group from the parser; and
generate, in parallel with the first prediction/transform unit, a third quantized transform coefficient signal for the third coding stripe; and
the fourth prediction/transform unit is configured to:
receive the fourth coding stripe of the second coding stripe group from the parser; and
generate, in parallel with the second prediction/transform unit, a fourth quantized transform coefficient signal for the fourth coding stripe;
a plurality of entropy encoders each communicatively coupled to a corresponding prediction/transform unit of the plurality of prediction/transform units, each entropy encoder of the plurality of entropy encoders is configured to:
obtain the corresponding quantized transform coefficient signal from the corresponding prediction/transform unit for the corresponding coding stripe; and
generate an encoded bitstream for the corresponding coding stripe from the corresponding quantized transform coefficient signal; and
a bitstream combiner communicatively coupled to the plurality of entropy encoders and configured to:
combine the encoded bitstreams from of the plurality of entropy encoders into a combined encoded bitstream as an encoded video frame of the unencoded video frame.

12. A decoding method, comprising:
receiving an encoded video frame;
determining a number of coding stripe groups in the encoded video frame and a length of each of a plurality of coding stripes that represent the encoded video frame;
extracting a plurality of coding stripe bitstreams from the encoded video frame based on the length of each of the plurality of stripes;
grouping the plurality of coding stripe bitstreams into a plurality of coding stripe groups based on the determined number of coding stripe groups, the plurality of coding stipe groups includes a first coding stripe group and a second coding stripe group, wherein the first coding stripe group includes at least a first coding stripe and a second coding stripe and the second coding stripe group includes at least a third coding stripe and a fourth coding stripe;
assigning each of the plurality of coding stripe bitstreams to one of a plurality of parallel decoding units;
generating corresponding blocks of quantized coefficients for each corresponding coding stripe;
generating first recovered blocks for the first coding stripe of the first coding stripe group in parallel with generating third recovered blocks for the third coding stripe of the second coding stripe group, wherein the generation of the first and third recovered blocks is performed without inter-coding stripe parsing dependency and without inter-coding stripe group reconstruction dependency;

generating second recovered blocks for the second stripe of the first coding stripe group in parallel with generating fourth recovered blocks for the fourth coding stripe of the second coding stripe group, wherein the generation of the second and fourth recovered blocks is performed without inter-coding stripe parsing dependency and without inter-coding stripe group reconstruction dependency; and reconstructing an unencoded video frame from the recovered blocks.

\* \* \* \* \*